Dec. 16, 1930.	B. DE MATTIA	1,784,960
COLLAPSIBLE CORE
Filed June 12, 1925	2 Sheets-Sheet 1
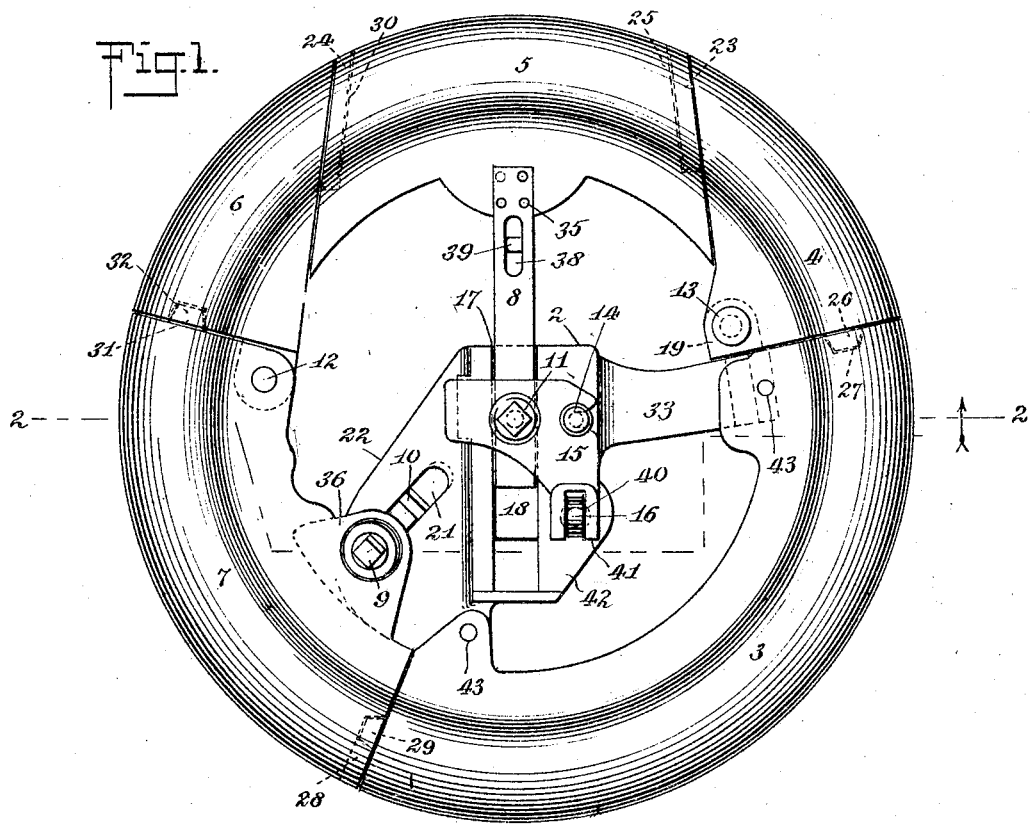
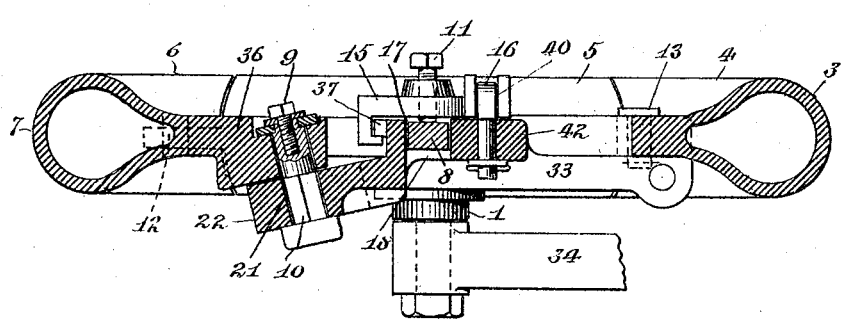

Dec. 16, 1930.  B. DE MATTIA  1,784,960
COLLAPSIBLE CORE
Filed June 12, 1925   2 Sheets-Sheet 2
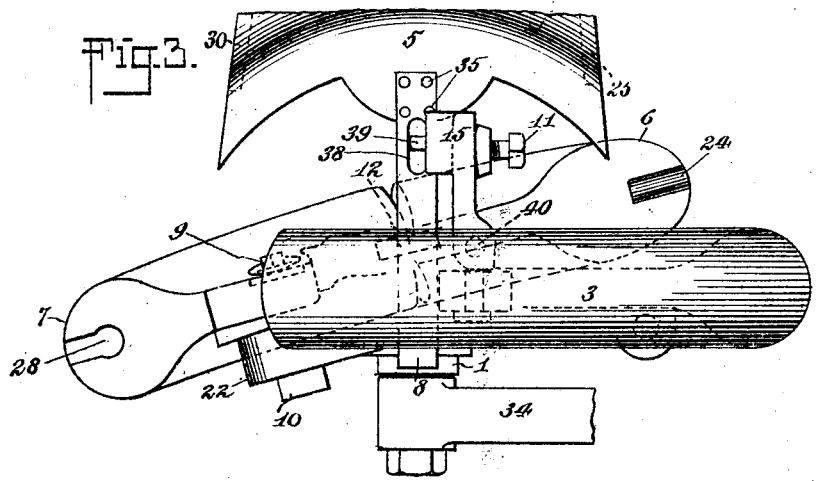
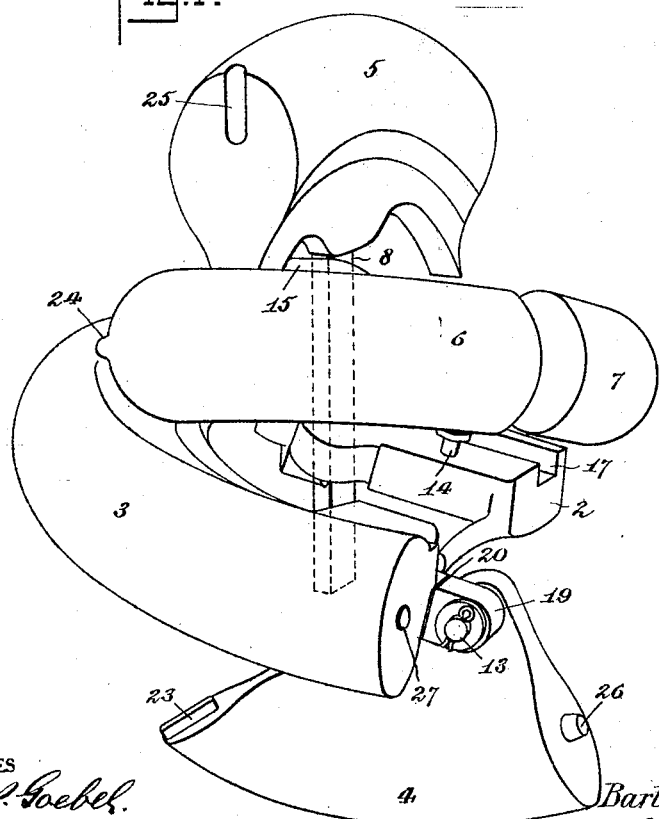
INVENTOR
Barthold DeMattia Patented Dec. 16, 1930

1,784,960

UNITED STATES PATENT OFFICE

BARTHOLD DE MATTIA, OF CLIFTON, NEW JERSEY, ASSIGNOR, BY MESNE ASSIGNMENTS, TO NATIONAL RUBBER MACHINERY COMPANY, OF AKRON, OHIO, A CORPORATION OF OHIO

COLLAPSIBLE CORE

Application filed June 12, 1925. Serial No. 36,698.

This invention relates to improvements in collapsible cores and more particularly to cores used in the building up of automobile tires.

One object of this invention is a core capable of being readily collapsed for the easy removal of a built-up tire therefrom.

In accordance with this invention, the core is composed of a plurality of sections, at least one of said sections arranged to remain in the plane of operative continuity; the remaining sections being capable of movement out of the aforesaid plane. In the preferred form, the core comprises a key or primary section capable of movement into a plane distinct from the plane of operative continuity, and a number of secondary sections pivoted for collapsing, one or more of said sections being so pivoted that it swings towards the center of the core and at the same time out of the plane of operative continuity thereof.

One form of the invention is illustrated in the drawing, consisting of two sheets, wherein:

Fig. 1 is a plan view;

Fig. 2 is a vertical section along the line 2—2 of Fig. 1, looking in the direction of the arrow;

Fig. 3 is an elevation with the core partially collapsed;

Fig. 4 is a perspective view of the core when collapsed under certain conditions.

Similar numerals refer to similar parts throughout the several figures.

As shown in the drawings, the device comprises a core consisting of a plurality of segmental sections 3, 4, 5, 6 and 7; and a chuck 2. The chuck 2 supports the core and is in turn supported upon a spindle 1 pivoted to a jack 34. The support or jack may be of any desired form, such, for example, as is shown in the patent to P. and B. De Mattia, U. S. No. 1,323,165, issued January 25, 1919; it being of course understood that the support is arranged so that the core may be disposed for use either horizontally or vertically as desired. In the present drawings, the core shown is indicated as normally positioned horizontally.

In the particular form disclosed herein the core consists of five sections, section 3 being fixed to the extension arms 22 and 33 of the chuck 2 by any suitable means, such as screws, rivets, bolts, 43; the key section 5 and the remaining sections 4, 6 and 7 being movable with respect to the chuck 2 and the fixed section 3. The section 4 is pivoted at 13 to a swivel 19 and is capable of swinging into and out of operative continuity with the other core sections, about said pivot 13. The swivel 19 is pivoted at 20 (see Fig. 4) to the extension arm 33 (see Fig. 1) of the chuck 2. By virtue of this combined swivel and pivot, the section 4 is not only capable of swinging into and out of operative continuity, but is also capable of movement into and out of the plane of operative continuity of said core.

It will of course be understood that what is meant by the expression "operative continuity" is that position where all of the sections of the segmental core are assembled to form a complete core with all the parts in the same plane; and that said plane is the one referred to by the expression "plane of operative continuity".

Section 7 includes an ear 36 pivoted at 9 to the extension arm 22 of the chuck 2. This pivot includes the bolt 10, which may be slidably moved in the guide or groove 21 formed in the extension arm 22 of the chuck 2. The face of the extension arm 22, which engages with the face of the ear 36, lies in a plane which is inclined to the plane of operative continuity. The ear 36 is substantially wedge-shaped (as shown in Fig. 2), its under face being parallel to the engaging face of the extension arm 22. The axis of the pivot 9 is substantially at right angles to the plane occupied by the engaging faces of the ear 36 and the extension arm 22, and consequently said axis is inclined with respect to the plane of operative continuity. This structural arrangement of the extension arm 22, ear 36 and pivot 9 results in causing the section 7 to swing about the pivot 9 towards the center of the core and at the same time outwards from the plane thereof; in other words, in swinging about the pivot 9, the section 7 moves in a plane angularly disposed with respect to the plane of operative continuity. Consequently the section 7 has fields of movement in two directions; firstly, a sliding movement (in the guide 21 of the extension arm 22) toward and away from the center of the core, during which movement section 7 is always in the plane of, or in a plane parallel to, the plane of operative continuity; and secondly, a swinging movement (about the pivot 9) during which movement section 7 travels in a plane angularly disposed to the plane of operative continuity. It is also evident that these two distinct movements may be used, either in combination or individually, as desired. Section 6 is pivoted at 12 to the section 7. As shown in the drawing, the axis of this pivot is at right angles to the plane of operative continuity. Section 6 therefore has several distinct fields of movement; it is separately movable about the pivot 12 and is also movable in unison with the section 7 when that section moves in the manner previously described. It follows therefore that section 6 is movable in the plane of operative continuity about the pivot 12; also, in a plane parallel to the plane of operative continuity by using the pivot 12 and the guide 21; and has a movement in a plane angularly disposed to the plane of operative continuity about the pivot 9.

It will be observed that the movement of the sections 4, 6 and 7 with relation to the plane of operative continuity, is in opposite directions, the section 7 moving into and out of the plane in one direction and carrying the section 6 with it, and the section 4 falling by gravity out of that plane in the opposite direction. By this means, a very effective disposition of the parts is secured, resulting in a maximum contraction and collapse of the core sections and forming approximately a helix when the parts are collapsed.

The key section 5 is wedge shaped, and is secured at 35 to a bar or shank 8 arranged to slide in a guide or groove 17, formed in the upper face of the chuck 2. Section 5 is retained in operative continuity by a latch plate 15 which is provided with a set screw 11 whose lower end is arranged to engage the bar or shank 8 when the section 5 is in the position of operative continuity. The latch plate 15 is designed to be movable both laterally in the plane of operative continuity, and into and out of said plane. The latch plate is therefore pivoted at 40 to the eye bolt 16 which is itself rotatable with respect to the chuck 2. In the normal position a slot in the latch plate engages a locking stud 14 and the tension of the set screw 11 locks the shank or bar 8. The hooked flange of the latch 15, which is clearly shown in section in Fig. 2, engages the shoulder 37 of the chuck 2 and it should be understood that the tensioning of the set screw 11 will have a tendency to move the latch plate about the pivot 40 and eye bolt 16 and to force the plate away from the chuck. This movement will be resisted by the stud 14, and the hooked flange of the latch plate in cooperation with the shoulder 37 of the chuck, thus locking the latch plate 15 in the position shown in Figs. 1 and 2. By loosening the set screw 11, the latch plate 15 and the eye bolt 16 may be rotated in unison until the notch in the latch plate is disengaged from the stud 14 and the flange of the latch plate and the shoulder 37 of the chuck are also disengaged, whereupon the latch plate 15 may be turned about the pivot 40 through an angle of 90° and rotated with the eye bolt 16 through an angle of 90°, until it is disposed in a position parallel to the guide or groove 17, and at right angles to the plane of operative continuity. In this position the heel 41 of the latch plate is resting upon the shoulder 42 of the chuck 2, and the latch plate may be said to be standing in an upright position.

When the latch plate 15 has been moved into the position previously described, the shank 8 of the key section 5 may be removed from the guide 17 and dropped into the opening 18 at the end of the guide 17 in the chuck 2, until the key section 6 comes to rest (as shown in Fig. 3) upon the upturned edge of the latch plate which constitutes a support for the key section 5 when the parts are collapsed as shown either in Fig. 3 or Fig. 4. This arrangement obviates the entire removal of the key section and insures its retention and partial assemblage with its component parts in position right at hand to be again and quickly placed in operative continuity. To assist in maintaining the several segmental sections in proper alignment in operative continuity and in the plane thereof, and to add to the rigidity of the core as a whole, the various sections are provided with grooves and studs. The section 3 is provided with a stud 29 which cooperates with the groove 28 in section 7, and with a groove 27 which cooperates with a stud 26 of the section 4. The key section 5 contains grooves 25 and 30 which cooperate with the tongues or studs 23 and 24 respectively of sections 4 and 6. Similarly, section 7 is provided with a stud 31 which cooperates with the groove 32 in the section 6.

In operation, the core is normally arranged with the core sections in operative continuity in the plane of operative continuity, as indicated in Fig. 1, in which condition the entire core is capable of freely rotating upon the jack 34, so that the operator may proceed to build up an automobile tire thereon. When the tire is completed, it is necessary to collapse the core, that is, to remove one or more sections from the plane of operative continuity, in order to permit the removal of the built-up tire therefrom. The tension is accordingly removed from the set screw 11 and the key section 5 is now withdrawn by sliding the shank or bar 8 in the guide 17; for this purpose the shank 8 is provided with a recess 38 and a bar 39, the latter capable of being engaged by a hook or other tool whereby the shank 8 and consequently the section 5 may be retracted. The latch plate 15 and the eye bolt 16 are now rotated in unison in the slot in the chuck 2 through an angle of approximately 90°; during which movement the latch plate is disengaged from the stud 14; it is now thrown back through an angle of approximately 90° about the pivot 40 in the eye bolt 16. The heel 41 of the latch plate 15 is now resting upon the shoulder 42 of the chuck, and the free end of the shank 8 may be inserted in the aperture 18 and the key section 5 is brought to rest upon the upturned edge of the latch plate thus being placed in a plane at right angles to the plane of operative continuity.

With the key section 5 thus disposed of, the complete collapsing movement of the core is readily obtained. This is accomplished by withdrawing the movable sections 4, 6 and 7 from the tire. In practice the preferred order of withdrawal of the movable sections is as follows.

The movable section 4 is withdrawn by swinging it about the pivot 13 (Fig. 1). After withdrawing this section it is released, whereupon it swings under the influence of gravity about the pivot 20 of the swivel 19. The movable section 6 may next be swung about the pivot 12 until that section is disengaged from the tire. The section 7 is then swung about the inclined pivot 9 and the sections 6 and 7 accordingly move as a group about the pivot 9 and in so doing the sections will be swung towards the center of the core, and since this pivot and the faces of the ear 36 and extension arm 22 are inclined with respect to the plane of the core, the sections 6 and 7 will also be swung outwardly from the plane of operative continuity. The section 6 may now be swung about the pivot 12 in a plane parallel to the plane of operative continuity until the section 6 is fully collapsed with respect to the section 7. After the sections 6 and 7 have been swung inwards and outwards in the manner previously described, they may, if so desired, be drawn still further towards the center of the core and at the same time still further out of the plane of operative continuity by sliding the bolt 10 to which the section 7 is secured in the groove 21 of the extension arm 22. The bolt 10 is arranged to slide freely in this groove thereby guiding the section further along the inclined face of the extension arm 22 of the chuck 2. The result of this movement is that when the bolt 10 is at the inner end of the groove 21, the sections 6 and 7 will occupy with respect to the fixed section 3, the position indicated in Fig. 4. The core is now in the collapsed condition (Fig. 4) and the tire may be readily removed therefrom.

After the section 4 has been moved in the manner previously described, the movable sections 6 and 7 may if desired be swung as a group about the pivot 9 without moving the section 6 about the pivot 12 in the first instance. In that event, at the completion of this movement sections 3, 5, 6 and 7 of the core will appear in elevation as indicated in Fig. 3.

What is claimed is:

1. In a collapsible core construction, the combination of a core body composed of a plurality of segmental sections, a relatively fixed support therefor, and a pivot connecting one of the segmental sections directly to the relatively fixed support, said pivot being shiftable bodily toward and from the center of the core.

2. In a collapsible core construction, the combination of a core body composed of a plurality of segmental sections, a relatively fixed support therefor, and a pivot connecting one of the segmental sections directly to the relatively fixed support, said pivot being shiftable bodily toward and from the center of the core along a path disposed diagonally of the core plane.

3. In a collapsible core construction, the combination of a core body composed of a plurality of segmental sections, a relatively fixed support therefor, and an inclined pivot connecting one of the segmental sections directly to the relatively fixed support on a transverse axis disposed diagonally of the core plane, said pivot being shiftable bodily toward and from the center of the core.

4. In a collapsible core construction, the combination of a core body composed of a plurality of segmental sections, a relatively fixed support therefor, and an inclined pivot connecting one of the segmental sections directly to the relatively fixed support on a transverse axis disposed diagonally of the core plane, said pivot being shiftable bodily toward and from the center of the core along a path disposed diagonally of the core plane.

5. In a collapsible core construction, the combination of a core body composed of a plurality of segmental sections, a support therefor, certain of said sections being hinged together end to end as a group, and a common pivot connecting said group of sections to the support, said pivot being shiftable bodily toward and from the center of the core.

6. In a collapsible core construction, the combination of a core body composed of a plurality of segmental sections, a support therefor, certain of said sections being hinged together end to end as a group, and a common pivot connecting said group of sections to the support, said pivot being shiftable bodily toward and from the center of the core along a path disposed diagonally of the core plane.

7. In a collapsible core construction, the combination of a core body composed of a plurality of segmental sections, a support therefor, certain of said sections being hinged together end to end as a group, and a common inclined pivot connecting said group of sections to the support, said pivot being shiftable bodily toward and from the center of the core along a path disposed diagonally of the core plane.

BARTHOLD DE MATTIA.